United States Patent
Ackley

Patent Number: 5,841,954
Date of Patent: Nov. 24, 1998

[54] DOT PRINTERS WITH WIDTH COMPRESSION CAPABILITIES

[75] Inventor: H. Sprague Ackley, Seattle, Wash.

[73] Assignee: Intermec Corporation, Everett, Wash.

[21] Appl. No.: 518,226

[22] Filed: Aug. 23, 1995

[51] Int. Cl.[6] .............. G06F 15/00; B41J 2/00; B41J 2/22; B41J 3/00

[52] U.S. Cl. .......... 395/108; 395/101; 395/102; 395/109; 395/110; 400/103; 400/124.01; 400/124.11; 101/93.01; 101/93.05; 101/93.13; 382/183; 382/258

[58] Field of Search ............ 358/447; 395/102, 395/108, 109, 112, 110, 114, 101; 400/121, 82, 124, 103, 104, 74; 101/93.13, 93.05, 93.01; 382/181, 183, 254, 258; 347/188, 195, 211

[56] References Cited

U.S. PATENT DOCUMENTS

| | | | |
|---|---|---|---|
| 3,975,707 | 8/1976 | Ito et al. | 346/76 R |
| 4,567,488 | 1/1986 | Moriguchi et al. | 346/76 PH |
| 4,699,531 | 10/1987 | Ulinski, Sr. et al. | 400/74 |
| 4,795,281 | 1/1989 | Ulinski, Sr. et al. | 400/74 |
| 4,824,266 | 4/1989 | Fujii et al. | 400/120 |
| 4,864,112 | 9/1989 | Imai et al. | 235/463 |
| 4,870,428 | 9/1989 | Kuwabara et al. | 346/76 PH |
| 4,937,590 | 6/1990 | Robillard et al. | 346/76 PH |
| 5,007,748 | 4/1991 | Lee et al. | 400/103 |
| 5,023,437 | 6/1991 | Speicher | 235/432 |
| 5,056,429 | 10/1991 | Hirosaki | 101/93.01 |
| 5,149,212 | 9/1992 | Murakami | 400/121 |
| 5,183,343 | 2/1993 | Tazawa et al. | 400/103 |
| 5,404,411 | 4/1995 | Banton et al. | 382/181 |
| 5,415,479 | 5/1995 | Kuhn et al. | 400/104 |
| 5,537,515 | 7/1996 | Yokoyama et al. | 395/109 |

FOREIGN PATENT DOCUMENTS

| | | |
|---|---|---|
| 0 329 369 | 8/1989 | European Pat. Off. . |
| 60-73852 | 4/1985 | Japan . |
| 61-22960 | 1/1986 | Japan . |
| 0 228 450 | 8/1990 | United Kingdom . |

OTHER PUBLICATIONS

Bassetti, L.W., and S. Kantor, "Print Enhancement for Laser Printers," *IBM Technical Disclosure Bulletin* 27(5): pp. 3071–3072, Oct. 1984.

Primary Examiner—Edward L. Coles
Assistant Examiner—Mark Wallerson
Attorney, Agent, or Firm—Seed and Berry LLP

[57] ABSTRACT

A printer for printing font and/or barcode character bars comprised of a plurality of rows in a direction of printing movement perpendicular to the character bars which are in turn comprised of a plurality of close adjacent dots to improve print quality at high printing speeds which induce elongated dot smear in the direction of printing movement and improve readability of optically read barcodes. There is a printhead for printing characters bars on a media surface as a series of dots. A drive system creates relative movement in the direction of printing movement between the printhead and the media. And, there is print logic for outputting character print signals to the printhead wherein the print logic includes logic for shaving at least a portion of one dot, one dot, or more from an end of each of the plurality of rows of a character bar which is otherwise over-wide.

16 Claims, 4 Drawing Sheets

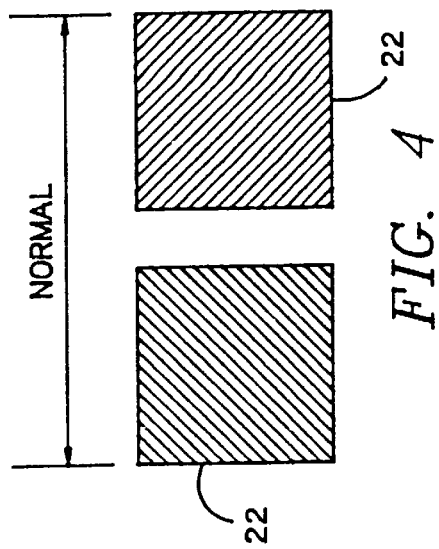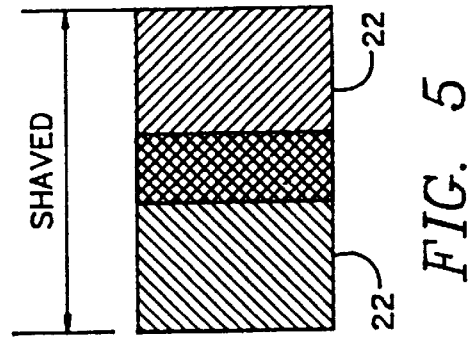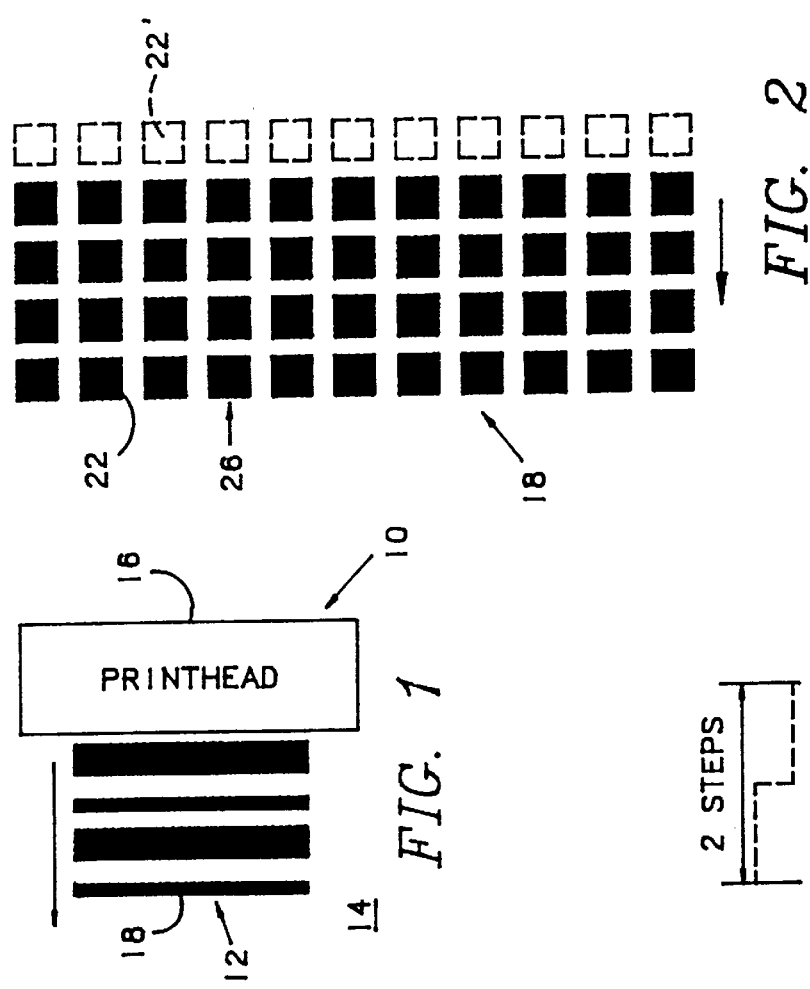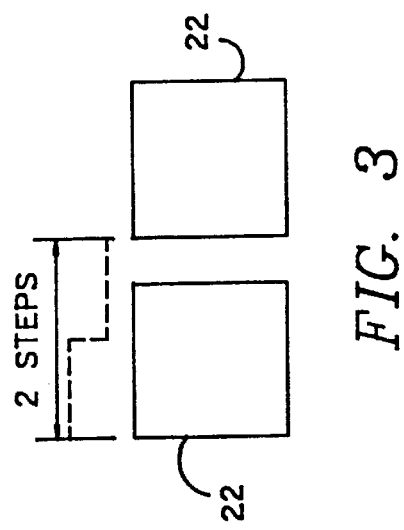

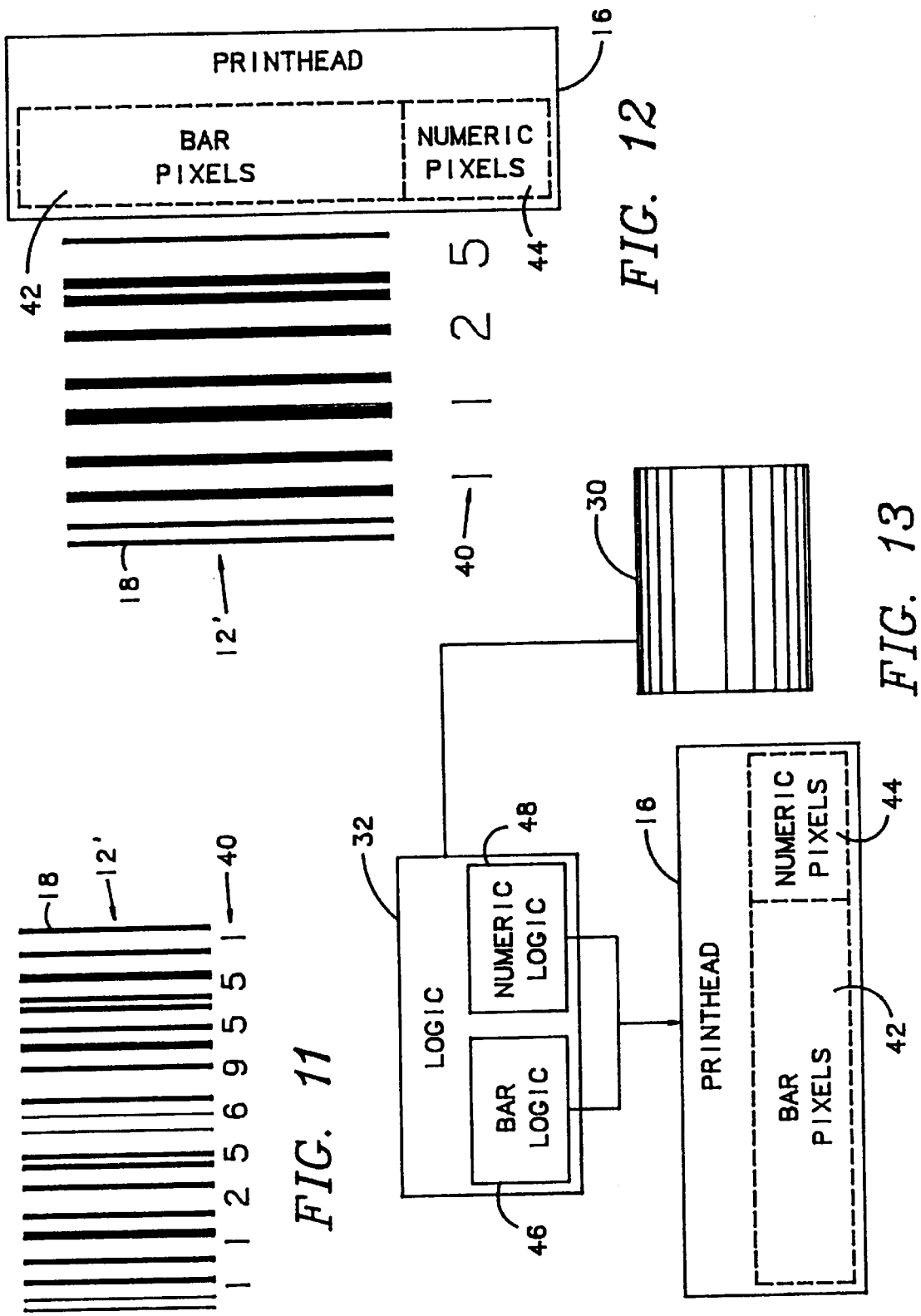

DOT PRINTERS WITH WIDTH COMPRESSION CAPABILITIES

BACKGROUND OF THE INVENTION

1. Technical Field

This invention relates to dot printers such as thermal printers and dot impact printers, and more particularly, to a printer for printing font and/or barcode character bars comprised of a plurality of rows in a direction of printing movement perpendicular to the character bars which are in turn comprised of a plurality of close adjacent dots to improve print quality at high printing speeds which induce elongated dot smear in the direction of printing movement and improve readability of optically read barcodes comprising, a printhead for printing characters bars on a media surface as a series of dots; a drive system creating relative movement in the direction of printing movement between the printhead and the media; and, print logic for outputting character print signals to the printhead, the print logic including logic for shaving at least a portion of one dot, one dot, or more from an end of each of the plurality of rows of a character bar which is otherwise over-wide.

2. Background Art

Various kinds of dot printers are known in the art. Early so-called "dot matrix" printers employed one or more pins driven forward and backward by a solenoid drive mechanism to transfer ink from a ribbon to the surface of a media as a series of dots or "pixels". This is as opposed to vector printers, for example, which physically move an ink pen (or other drawing device) over the surface of the media in a series of two dimensional lines to form the characters of interest. It is also as opposed to laser printers, electrostatic printers, and the like, which form an entire two dimensional area as dots from a "toner" material which is then transferred to the surface of the media and fused to the surface by the application of heat.

While mechanical dot matrix printers are still used in some applications, modern dot printers are more likely to employ a thermal printhead or an inkjet printhead. For example, FIG. 1 shows a portion of a label printer 10 which prints barcodes 12 on a media 14 with a printhead 16. As can be seen more clearly in the enlarged drawing of FIG. 2, the bars 18 of the barcode 12 are comprised of a series of rows 20 of adjacent dots 22. In the case of a thermal printhead 16, the dots 22 are produced by a series of dot-sized heating elements (not shown) within the printhead 16 which are selectively heated momentarily thereby causing dot-sized areas of ink carried by a ribbon (not shown) to be transferred to the surface of the media 14. In the case of an inkjet printhead 16, dots of ink are actually projected by the printhead 16 onto the surface of the media 14.

For various reasons set forth with particularity in copending applications by the inventor herein entitled U.P.C./EAN SYMBOLOGY FONT OPTIMIZATION IN AN ON-DEMAND PRINTER (Ser. No. 08/518,423), BAR SHAVING OF THE RESIDENT FONTS IN AN ON-DEMAND BAR-CODE PRINTER (Ser. No. 08/518,503), and SPEED FONTS FOR MATRIX PRINTERS (Ser. No. 08/518,424), filed on even date herewith and assigned to the common assignee of this application, the teachings of which are incorporated herein by reference, it can be particularly beneficial to both barcode and alpha-numeric character production in dot printers to "shave" the width of the vertical bars (with respect to a horizontal direction of movement). For example, the printer 10 of FIG. 1 is printing the barcode 12 in what is called the "picket fence" mode. The bars 18 are vertical with respect to a horizontal direction of printing as the figure is viewed. This is as opposed to the "drag" mode in which printing takes place down the bars 18 instead of across them as is taking place in FIG. 1. One way of shaving the bars 18 is to simply not print the last dot position 22' of each row 26 for each bar 18 as shown ghosted in FIG. 2. That approach is limited by the size of the "dots" 22 being produced in the printer 10 by the printhead 16. A typical barcode printer being sold commercially by the assignee of this application employs bar positions consisting of five dots of 5 mil width each. Thus, the nominal width of a bar position is 25 mils. By removing one dot, the nominal bar width is reduce by 20% to 20 mils. Removing two dots causes the bar width to be reduced by 40% to 15 mils.

It would be beneficial in some applications if the vertical bar components of barcode or alpha-numeric characters could be reduced or shaved by less than a full dot position. This is particularly true in the case of barcode printers with a resolution in the 200 dots per inch (dpi) range. In such cases, being able to reduce the width by 10% rather than 20% would be worth any penalty that might result such as a reduction in printer throughput. The problem is one of optical readability. If one requires a low-cost barcode printer which will print barcodes with a high degree of decodeability accuracy, speed may become a tradeoff factor as a matter of necessity.

Wherefore, it is an object of the present invention to provide methods and apparatus for dot printers in which the overall width of adjacent dot pairs in the direction of printing can be reduced by less than the width of one full dot.

It is another object of the present invention to provide methods and apparatus for dot printers in which the overall width of adjacent dot pairs in the direction of printing can be shaved by printing the dots closer together.

It is still another object of the present invention to provide methods and apparatus for dot printers printing combined barcodes and numeric characters in which the overall width of adjacent dot pairs in the direction of printing of the barcode bars can be shaved while not affecting the spacing of dots in the numeric characters.

Other objects and benefits of this invention will become apparent from the description which follows hereinafter when read in conjunction with the drawing figures which accompany it.

SUMMARY

The foregoing objects have been achieved by the printer of the present invention for printing font and/or barcode character bars comprised of a plurality of rows in a direction of printing movement perpendicular to the character bars which are in turn comprised of a plurality of close adjacent dots to improve print quality at high printing speeds which induce elongated dot smear in the direction of printing movement and improve readability of optically read barcodes comprising, a printhead for printing characters bars on a media surface as a series of dots; a drive system creating relative movement in the direction of printing movement between the printhead and the media; and, print logic for outputting character print signals to the printhead, the print logic including logic for shaving at least a portion of one dot, one dot, or more from an end of each of the plurality of rows of a character bar which is otherwise over-wide.

In one embodiment, the print logic further comprises logic which outputs character print signals eliminating a last dot from each of the plurality of rows of a character bar which is otherwise over-wide.

In another embodiment, the print logic comprises logic which outputs character print signals eliminating two last dots from each of the plurality of rows of a character bar which is too wide for optimal reading by optical reading apparatus.

In still another embodiment, the drive system creates relative movement between the media and the printhead in at least two steps between printing positions of the printhead; the drive system is controlled by the print logic; and, the print logic shaves less than one dot from an end of each of the plurality of rows of a character bar which is otherwise over-wide by stepping the drive system less than a number of steps between the printing positions before the printhead prints a next dot at the end whereby a last pair of dots at the end are overlapped. Preferably in such an embodiment, the drive system creates relative movement between the media and the printhead by two steps between the printing positions of the printhead; and, the print logic cause the printhead to print after one step of relative movement.

In a preferred embodiment for printing barcodes with numerals associated therewith, the printhead is divided into a barcode printing portion and a numeric printing portion; and, the print logic includes logic for printing barcodes with the barcode portion independently of printing numerals with the numeric printing portion whereby numerals are not compressed as a result of shaving bars of barcodes.

DESCRIPTION OF THE DRAWINGS

FIG. 1 is a simplified drawing of a dot printhead printing barcode in a "picket fence" mode.

FIG. 2 is an enlarged simplified drawing of a portion of a vertical bar comprise of rows of adjacent dots and depicting how the bar can be reduced in width by eliminating a last dot in each row thereof.

FIG. 3 is a greatly enlarged simplified drawing showing how two adjacent dots are normally spaced by two steps.

FIGS. 4 and 5 are greatly enlarged simplified drawings showing the normal dot width of two adjacent dots and the dot width of two adjacent "shaved" dots as produced by the apparatus of the present invention.

FIG. 11 is a simplified drawing of a barcode which includes human-readable numeric characters beneath it.

FIG. 12 is an enlarged functional block diagram of a printhead according to the present invention for printing barcodes such as that depicted in FIG. 11.

FIG. 13 is an enlarged functional block diagram of a portion of a printer as in FIGS. 6 and 7 employing the printhead of FIG. 12.

DESCRIPTION OF THE PREFERRED EMBODIMENTS

The basic principal employed in the present invention in its various embodiments to be described in detail hereinafter is depicted in FIGS. 3–5. As depicted in FIG. 3, two adjacent dots 22 in the direction of printing are printed in two (or more) step increments from one another in certain types of printers. The present invention is applicable to such printers and employs this fact to accomplish its objectives. Thus, two adjacent dot pairs can be produced in a "normal" mode as depicted in FIG. 4 or in a "shaved" mode as depicted in FIG. 5. If the normal spacing is two steps as depicted in FIG. 3, the normal spacing of FIG. 4 is produced by employing the usual two steps while the shaved spacing of FIG. 5 is produced by employing only one step between dot printings. What results is two dots 22 partially overlapped. The way this is accomplished in various printers and any special considerations will now be set forth in detail.

Figure 6:
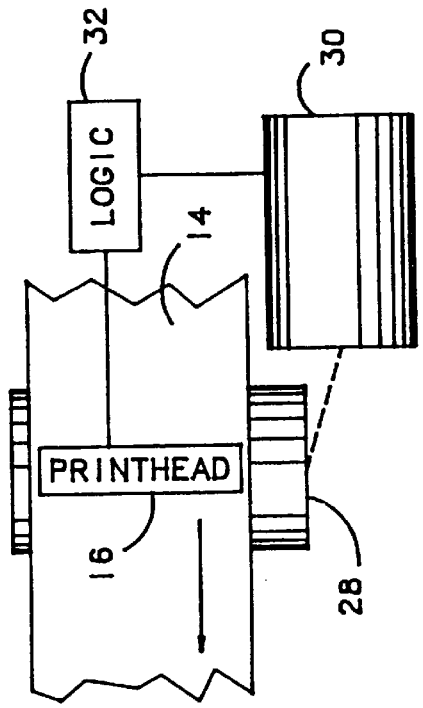
FIG. 6 is a simplified side view and partial functional block diagram of a dot printer according to the present invention in which the media is moved under the printhead.
Figure 7:
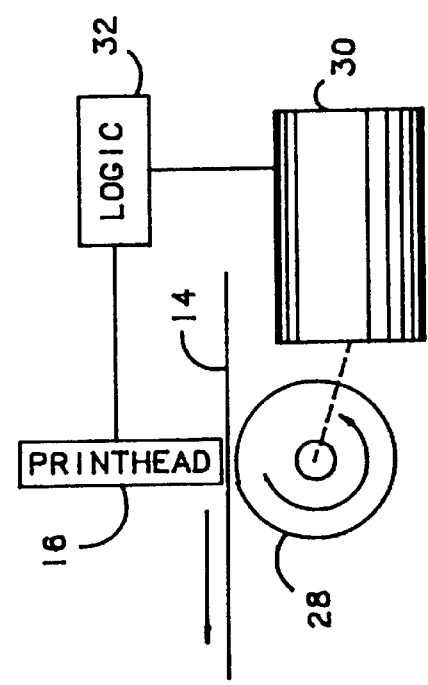
FIG. 7 is a plan view of the printer of FIG. 6.
Figure 8:
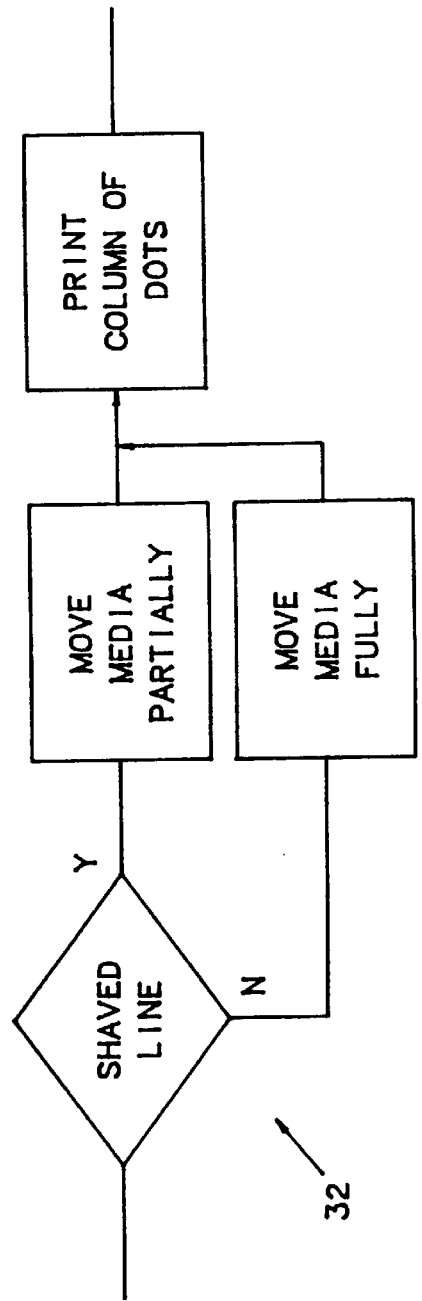
FIG. 8 is a flowchart of exemplary logic that can be employed in the printer of FIGS. 6 and 7 according to the present invention.

In a first printer 10 operating in the manner of FIG. 1 as depicted in FIGS. 6 and 7, the media 14 is driven under a fixed printhead 16 by a platen roller 28. The platen roller 28 is driven by a stepping motor 30 under the control of logic 32, which also controls the printing of the printhead 16. Thus, it is the stepping of the stepping motor 30 which determines the "steps" between the printing of adjacent dots 22 on the media 14 in the direction of printing. By incorporating logic as depicted in FIG. 8 within the logic 38 driving the stepping motor 30, the objectives of the present invention can be accomplished. When moving the media 14, the logic 38 checks to see if it is about to print a shaved line portion (or shaved adjacent dot pair). If it is, the media 14 is only moved partially as, for example, one step instead of two, before the next dot 22 is printed. That results in overlapping of the two dots 22 as in FIG. 5. If not, the media 14 is moved fully to its next position before printing resulting in the "normal" dot spacing of FIG. 4.

Two main considerations should be mentioned at this point. First, if printing shaved barcode bars, the shaving should take place at the end of the bar with respect to the printing direction and the media 14 should be advanced to the next normal dot position so that the space following a shaved bar will be increased in width by the same amount as the bar was shaved. For example, using the prior-described situation of five 5 mil dots per bar position, if a bar is shaved by a half dot to 22.5 mils in width, the following space will be increased by the same 2.5 mils to 27.5 mils. Second, if shaving a front bar in the direction of printing (as for example when printing high-speed alpha-numeric characters), the space in front of the character bar should be increased by an extra step with the next dot 22 following in one step. Otherwise, a gap could be produced within the character itself.

Figure 9:
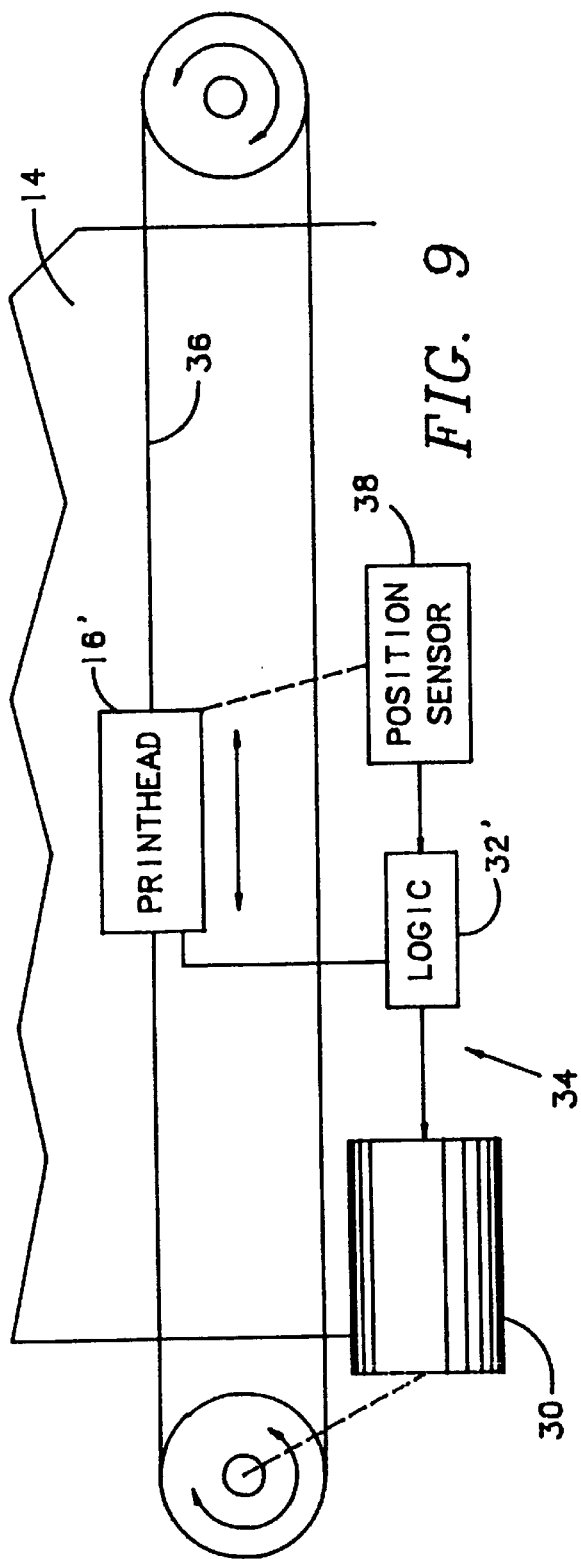
FIG. 9 is a simplified plan view and partial functional block diagram of a dot printer according to the present invention in which the printhead is moved across the media.
Figure 10:
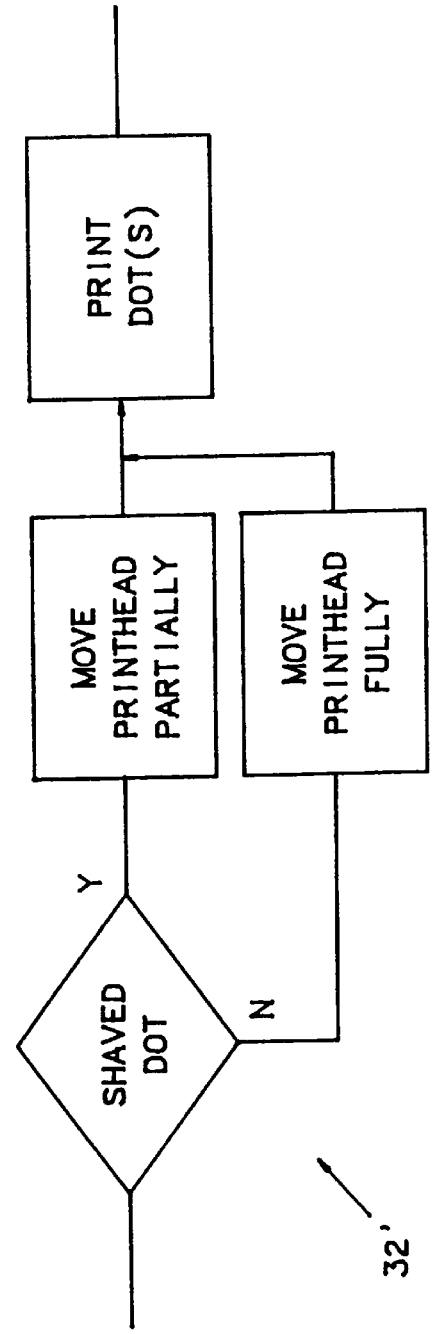
FIG. 10 is a flowchart of exemplary logic that can be employed in the printer of FIG. 9 according to the present invention.

As depicted in FIGS. 9 and 10, the present invention can also be employed in a high-speed dot matrix printer 34 in which the media 14 is fixed in the direction of printing and the printhead 16' moves across the media 14 from side to side as with the moving tape 36 which is moved bi-directionally by the stepping motor 30. As with the printer 10, logic 32' controls the stepping motor 30 and the printhead 16'. The movement and positioning of the printhead 16' vis-a-vis printing by the printhead 16' can take place in two ways. If the printhead 16' and its horizontal position on the media 14 are totally under the control of the stepping motor 30, the stepping motor 30 can be employed totally as in the prior embodiment of FIGS. 6–8. In some ultra-high-speed printers, however, the printhead 16' is actually rebounded off springs or elastomeric bumpers at the ends of travel in order to increase throughput speed. In such case, the stepping motor 30 cannot be used to control the position of the printhead 16' and, in fact, may be replaced by another type of drive motor such as a linear motor. The instantaneous horizontal position of the printhead 16' is provided by a position sensor 38 which is connected to the logic 32'. Exemplary logic for the logic 32' to implement the present invention in the printer 34 is depicted in FIG. 10. If printing a shaved dot, the printhead 16' is "moved" partially just as the media 14 was moved partially in the prior embodiment. In this case, however, the term "moved" can be interpreted one of two ways, depending on the configuration and type of the printer 34. If the stepping motor 30 is in control of the position of the printhead 16', the printhead 16' is physically moved in the manner directed. If the position sensor 38 is being employed, the dot(s) are printed by the printhead 16' when the sensor 38 indicates to the logic 32' that the printhead 16' has moved the desired distance.

A further consideration relative to barcode printing and the shaving of the bars thereof according to the present invention is depicted in FIGS. 11–13. U.P.C./EAN barcodes 12' are often accompanied by the human-readable numeric equivalent characters 40 as depicted in FIG. 11. If the characters 40 are shaved along with the bars 18 of the barcode 12', their readability and clarity might be altered to an undesirable degree. This is addressed by the present invention in the manner shown in FIGS. 12 and 13. The printhead 16 includes a majority of pixel-producing positions designated as "bar pixels" 42 and the remaining pixel-producing positions designated as "numeric pixels" 44. Correspondingly, the logic 32 contains bar logic 46 and numeric logic 48. When controlling the stepping motor 30 and the printhead 16, the bar logic 46 is the only one performing the shaving of bars 18 as described above. Thus, under the control of the numeric logic 48, the numeric characters 40 are printed normally without regard to any shaving taking place in the bars 18 of the barcode 12'.

Wherefore, having thus described the present invention, What is claimed is:

1. A printer for printing font and/or barcode character bars comprised of a plurality of rows in a direction of printing movement perpendicular to the character bars which are in turn comprised of a plurality of close adjacent dots to improve print quality at high printing speeds which induce elongated dot smear in the direction of printing movement and improve readability of optically read barcodes comprising:

a printhead for printing a characters bars on a media surface as a series of dots;

a drive system creating relative movement in the direction of printing movement between said printhead and the media; and, print logic for outputting character print signals to said printhead, said print logic including logic for shaving at least a portion of at least one dot from an end of each of the plurality of rows of a character bar when the printer is operating at high printing speeds.

2. The printer of claim 1 wherein said print logic further comprises:

logic which outputs character print signals eliminating a last dot from each of the plurality of rows of a character bar when the printer is operating at high printing speeds.

3. The printer of claim 1 wherein said print logic comprises:

logic which outputs character print signals eliminating two last dots from each of the plurality of rows of a character bar when the printer is operating at high printing speeds.

4. A printer for printing font and/or barcode characters comprised of a plurality of rows in a direction of printing movement perpendicular to the character bars which are in turn comprised of a plurality of close adjacent dots to improve print quality at high printing speeds which induce elongated dot smear in the direction of printing movement and improve readability of optically read barcodes comprising:

a printhead for printing characters bars on a media surface as a series of dots, a drive system creating relative movement between the media and said printhead in at least two steps between printing positions of said printhead;

a drive system creating relative movement in the direction of printing movement between said printhead and the media; and, a print logic for outputting character print signals to said printhead, said print logic including logic for shaving less than one dot from an end of each of the plurality of rows of a character bar when the printer is operating at high printing speeds by stepping said drive system less than a number of steps equal to the number of steps between said printing positions before said printhead prints a next dot at said end whereby a last pair of dots at said end are overlapped wherein said drive system is controlled by said print logic.

5. A printer for printing font and/or barcode character bars comprised of a plurality of rows in a direction of printing movement perpendicular to the character bars which are in turn comprised of a plurality of close adjacent dots to improve print quality at high printing speeds which induce elongated dot smear in the direction of printing movement and improve readability of optically read barcodes comprising:

a printhead for printing characters bars on a media surface as a series of dots:

a drive system which creates relative movement in the direction of printing between the media and said printhead by two steps between said printing positions of said printhead; and, a print logic for outputting character print signals to said printhead, said print logic including logic for shaving less than one dot from an end of each of the plurality of rows of a character bar when the printer is operating at high printing speeds, said print logic causing said printhead to print after one step of relative movement, said drive system controlled by said print logic.

6. A printer for printing font and/or barcode character bars comprised of a plurality of rows in a direction of printing movement perpendicular to the character bars which are in turn comprised of a plurality of close adjacent dots to improve print quality at high printing speeds which induce elongated dot smear in the direction of printing movement and improve readability of optically read barcodes comprising:

a printhead for printing characters bars on a media surface as a series of dots:

a drive system creating relative movement in the direction of printing movement between said printhead and the media: and, print logic for outputting character print signals to said printhead, said print logic including logic for shaving at least a portion of at least one dot from an end of each of the plurality of rows of a character bar when the printer is operating at high printing speeds. wherein:

said printhead is divided into a barcode printing portion and a numeric printing portion; and, said print logic includes logic for printing barcodes with said barcode portion independently of printing numerals with said numeric printing portion whereby numerals are not compressed as a result of shaving bars of barcodes.

7. A barcode printer for printing barcode character bars comprised of a plurality of rows in a direction of printing movement perpendicular to the character bars which are in turn comprised of a plurality of close adjacent dots with improved print quality and improved readability of optically read barcodes comprising:

a printhead for printing barcode character bars on a media surface as a series of dots;

a drive system creating relative movement in the direction of printing movement between said printhead and the media; and, print logic for outputting character print signals to said printhead, said print logic including logic for shaving at least a portion of at least one dot from an end of each of the plurality of rows of a character bar when the printer is operating at high printing speeds.

8. The barcode printer of claim 7 wherein said print logic further comprises:

logic which outputs character print signals eliminating a last dot from each of the plurality of rows of a character bar when the printer is operating at high printing speeds.

9. The barcode printer of claim 7 wherein said print logic comprises:

logic which outputs character print signals eliminating two last dots from each of the plurality of rows of a character bar when the printer is operating at high printing speeds.

10. A barcode printer for printing barcode character bars comprised of a plurality of rows in a direction of printing movement perpendicular to the character bars which are in turn comprised of a plurality of close adjacent dots with improved print quality and improved readability of optically read barcodes comprising:

a printhead for printing barcode character bars on a media surface as a series of dots;

a drive system creating relative movement in the direction of printing movement between the media and said printhead in at least two steps between printing positions of said printhead; and, a print logic for outputting character print signals to said printhead said print logic shaving less than one dot from an end of each of the plurality of rows of a character bar when the printer is operating at high printing speeds by stepping said drive system less than a number of steps equal to the number of steps between said printing positions before said printhead prints a next dot at said end whereby a last pair of dots at said end are overlapped wherein said drive system is controlled by said print logic.

11. A barcode printer for printing barcode character bars comprised of a plurality of rows in a direction of printing movement perpendicular to the character bars which are in turn comprised of a plurality of close adjacent dots with improved print quality and improved readability of optically read barcodes comprising:

a printhead for printing barcode character bars on a media surface as a series of dots:

a drive system:

a print logic for outputting character print signals to said printhead, said print logic including logic for shaving less than one dot from an end of each of the plurality of rows of a character bar when the printer is operating at high printing speeds, wherein:

said drive system creates relative movement between the media and said printhead by two steps between said printing positions of said printhead, said drive system controlled by said print logic; and, said print logic causing said printhead to print after one step of relative movement.

12. A barcode printer for printing barcode character bars comprised of a plurality of rows in a direction of printing movement perpendicular to the character bars which are in turn comprised of a plurality of close adjacent dots with improved print quality and improved readability of optically read barcodes comprising:

a printhead for printing barcode character bars on a media surface as a series of dots:

a drive system creating relative movement in the direction of printing movement between said printhead and the media: and, print logic for outputting character print signals to said printhead, said print logic including logic for shaving at least a portion of at least one dot from an end of each of the plurality of rows of a character bar when the printer is operating at high printing speeds, wherein the printer prints numerals associated with a barcode in combination with the barcode and wherein:

said printhead is divided into a barcode printing portion and a numeric printing portion; and, said print logic includes logic for printing barcodes with said barcode portion independently of printing numerals with said numeric printing portion whereby numerals are not compressed as a result of shaving bars of barcodes.

13. A barcode printer for printing barcode character bars comprised of a plurality of rows in a direction of printing movement perpendicular to the character bars which are in turn comprised of a plurality of close adjacent dots with improved print quality and improved readability of optically read barcodes comprising:

a thermal printhead for printing barcode character bars on a media surface as a series of dots;

a drive system creating relative movement in the direction of printing movement between said printhead and the media; and, print logic for outputting character print signals to said printhead, said print logic including logic for removing at least a portion of at least one dot from an end of each of the plurality of rows of a character bar when the printer is operating at high printing speeds.

14. The barcode printer of claim 13 wherein said print logic further comprises:

logic which outputs character print signals eliminating a last dot from each of the plurality of rows of a character bar when the printer is operating at high printing speeds.

15. The barcode printer of claim 13 wherein said print logic comprises:

logic which outputs character print signals eliminating two last dots from each of the plurality of rows of a character bar when the printer is operating at high printing speeds.

16. A barcode printer for printing barcode character bars comprised of a plurality of rows in a direction of printing movement perpendicular to the character bars which are in turn comprised of a plurality of close adjacent dots with improved print quality and improved readability of optically read barcodes comprising:

a thermal printhead for printing barcode character bars on a media surface as a series of dots;

a drive system creating relative movement in the direction of printing movement between said printhead and the media; and, print logic for outputting character print signals to said printhead, said print logic including logic for removing at least a portion of at least one dot from an end of each of the plurality of rows of a character bar when the printer is operating at high printing speeds, wherein the printer prints numerals associated with a barcode in combination with the barcode and wherein:

said printhead is divided into a barcode printing portion and a numeric printing portion; and, said print logic includes logic for printing barcodes with said barcode portion independently of printing numerals with said numeric printing portion whereby numerals are not compressed as a result of shaving bars of barcodes.

* * * * *